United States Patent
Klitsch et al.

(10) Patent No.: US 6,827,342 B2
(45) Date of Patent: Dec. 7, 2004

(54) SHOCK ABSORBER

(75) Inventors: Bernd Klitsch, Nümbrecht (DE); Stefan Brehm, Hennef (DE); Michael Müller, Hennef (DE); Manfred Heinisch, Eitorf (DE)

(73) Assignee: ZF Sachs AG, Eitorf (DE)

(*) Notice: Subject to any disclaimer, the term of this patent is extended or adjusted under 35 U.S.C. 154(b) by 0 days.

(21) Appl. No.: 10/369,932

(22) Filed: Feb. 19, 2003

(65) Prior Publication Data

US 2003/0160367 A1 Aug. 28, 2003

(30) Foreign Application Priority Data

Feb. 27, 2002 (DE) .......................................... 102 08 559
Sep. 26, 2002 (DE) .......................................... 102 44 776

(51) Int. Cl.$^7$ ................................................ F16F 9/04
(52) U.S. Cl. ............................... 267/64.23; 267/64.24; 267/64.21; 267/64.27; 188/322.12
(58) Field of Search .......................... 267/64.23, 64.19, 267/64.21, 64.27, 64.24, 122; 188/298, 322.12, 322.14, 322.18, 322.19

(56) References Cited

U.S. PATENT DOCUMENTS

| | | | | |
|---|---|---|---|---|
| 3,046,002 A | * | 7/1962 | Schmitz .................... | 267/64.24 |
| 3,749,210 A | * | 7/1973 | DEBaan et al. ............. | 188/298 |
| 4,022,448 A | * | 5/1977 | Reeder ........................ | 267/226 |
| 4,828,232 A | * | 5/1989 | Harrod et al. ........... | 267/64.24 |
| 5,460,354 A | * | 10/1995 | Easter ...................... | 267/64.27 |
| 6,585,239 B2 | * | 7/2003 | Eichhorn et al. ........ | 267/64.24 |

* cited by examiner

Primary Examiner—Matthew C. Graham
Assistant Examiner—Mariano Sy
(74) Attorney, Agent, or Firm—Cohen, Pontani, Lieberman & Pavane

(57) ABSTRACT

A shock absorber includes a damping element and an air spring, the damping element having a container tube, a fixing part and a piston rod. The air spring has a spring bellows acting as a rolling bellows, an outer tube connected to a mass to be held with little oscillation, and a rolling tube bearing a rolling profile. The spring bellows bounds a gas chamber provided with a gas filling under pressure, while the rolling tube seals off the gas chamber with respect to the container tube and is fixed to the latter in the axial direction. Between the container tube and the rolling tube there is arranged a compression stop cap having three webs and thickened ends, which serve as a stop on the container tube for the rolling tube and to dissipate the radial force component acting on the latter.

7 Claims, 2 Drawing Sheets

SHOCK ABSORBER

BACKGROUND OF THE INVENTION

1. Field of the Invention

The invention relates to a shock absorber, comprising a damping element and an air spring, the damping element having a container tube, a fixing part and a piston rod, and the air spring comprising a spring bellows acting as a rolling bellows, an outer tube connected to a mass to be held with little oscillation and a rolling tube bearing a rolling profile. The spring bellows bounds a gas chamber provided with a gas filling under pressure, while the rolling tube seals off the gas chamber with respect to the container tube and is fixed to the latter.

2. Description of the Related Art

Shock absorbers of the aforementioned type are used, for example, on a suspension of a chassis of a utility vehicle, in order largely to keep away the oscillations introduced into the chassis via the wheel suspensions by the road. In this case, the outer tube of the air spring and a piston rod of the damping element are connected to the vehicle superstructure and the chassis. The action of the air spring depends on the size of and the pressure prevailing in the gas chamber, the distance of the outer tube from the rolling tube, and the shape of the rolling profile on the rolling tube. While the problem of sealing off the gas chamber with respect to the atmosphere is solved by using an O-ring between the rolling tube of the air spring and the container tube of the damping element, a design has hitherto been chosen which provides for a supporting ring, which can be produced only with a great deal of expenditure on production and has to be connected to the container tube. One contour of the rolling tube can then be supported on the supporting ring. However, the higher the numbers are, the greater the demand for rationalization of the aforementioned supporting point for the rolling tube on the container tube.

SUMMARY OF THE INVENTION

In order to support the rolling tube on the container tube, the present invention introduces a compression stop cap, whose basic body is tubular in order to support the rolling tube with respect to the container tube. The rolling tube is therefore supported by the compression stop cap. When the shock absorber is installed, the result is therefore a stable positional state for the rolling tube with respect to the container tube of the damping element.

The present invention has therefore taken as its object the provision of a shock absorber, comprising a damping element and an air spring, in which a rolling tube, as a constituent part of the air spring, can be supported with respect to a container tube of the damping element in a cost-effective way and with little expenditure on assembly.

An exemplary embodiment of supporting a rolling tube of an air spring with respect to a container tube of a damping element will be explained by using a number of drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
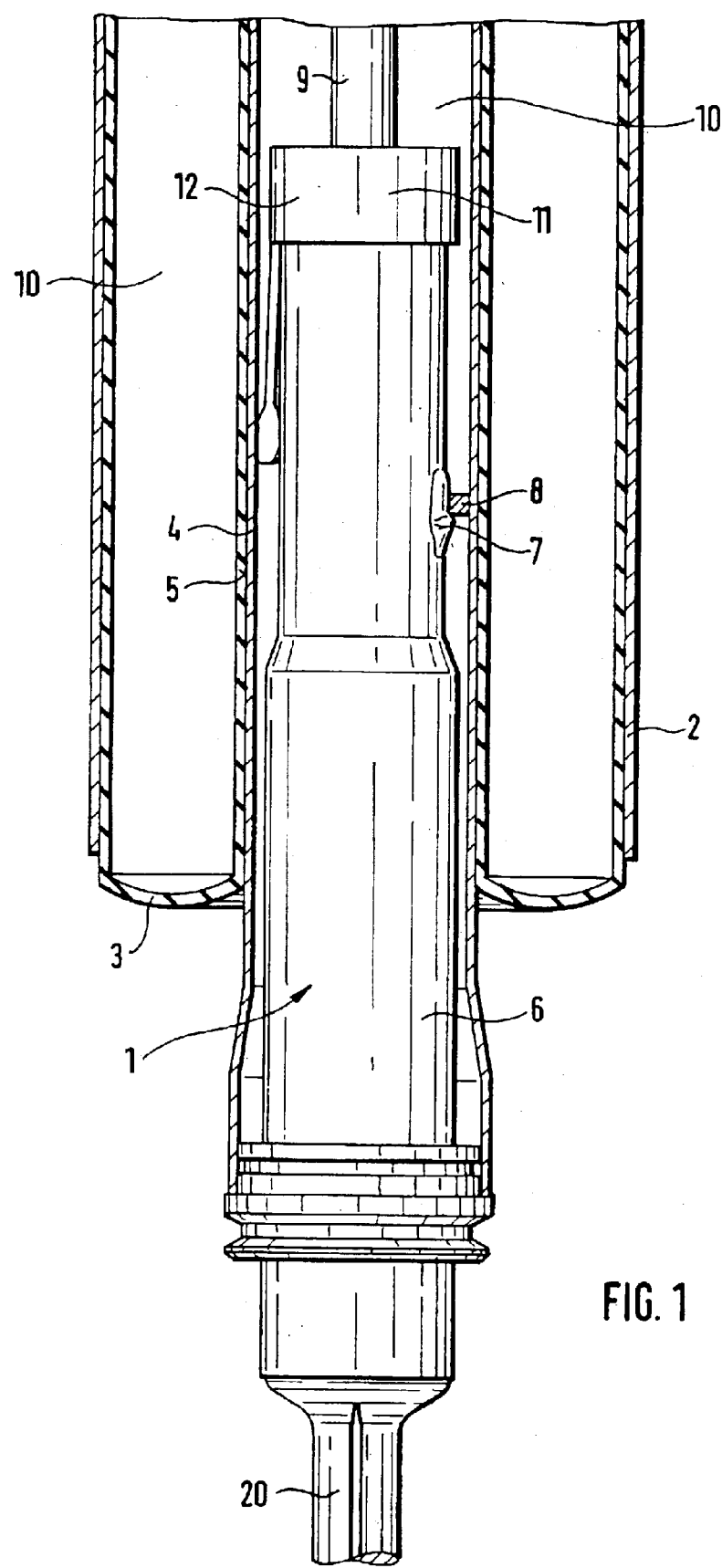
FIG. 1 shows a shock absorber with support for a rolling tube with respect to a container tube, once in a conventional design and once by means of a compression stop cap with a thickened end.
Figure 2:
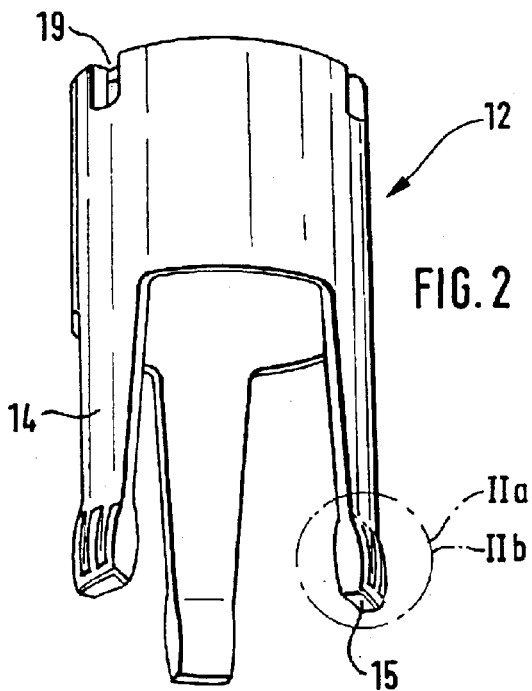
FIG. 2 shows the compression stop cap with two enlargements relating to the thickened end, which has a supporting profile radially on the outside and a contact profile radially on the inside for contact with the container tube.
Figure 2A:
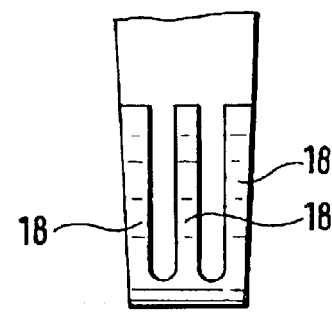
Figure 2B:
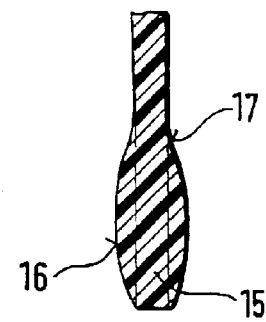

A shock absorber according to the present invention is illustrated in FIG. 1 and comprises a damping element 1 and an air spring, the damping element 1 having a container tube 6, a fixing part 20 and a piston rod 9. The air spring includes a spring bellows 3 acting as a rolling bellows, a gas chamber 10 under compressive prestress, and an outer tube 2 connected to a mass to be held with little oscillation, and a rolling tube 4 bearing a rolling profile 5. The spring bellows 3, as a resilient element, connects the outer tube 2 and the rolling tube 4, the spring bellows 3 rolling on the rolling profile 5 of the rolling tube 4 during any axial relative movement of the outer tube 2 with respect to the rolling tube 4 and performing the function of a spring as a result of the compression of the gas. In the present exemplary embodiment, the rolling tube 4 encases the container tube 6 virtually completely and, in the vicinity of the fixing part 20, is sealed off with respect to the container tube 6, so that the gas chamber encloses the container tube 6. Support for the rolling tube 4 with respect to the container tube 6 is achieved in a cost-effective manner by fitting a tubular compression stop cap 12 which, according to FIG. 2, has a base 13 and webs 14 with thickened ends 15.

Figure 3:
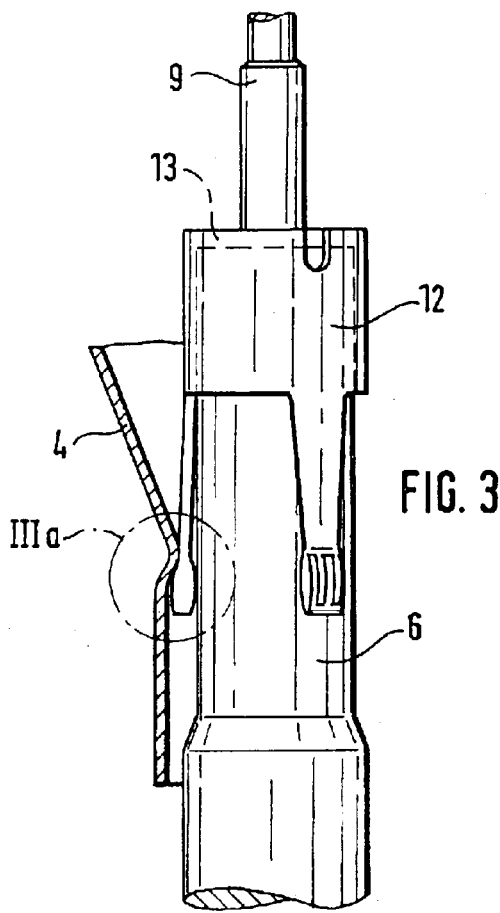
FIG. 3 shows the compression stop cap on the damping element with its thickened end between the rolling tube and the container tube, in an enlarged illustration.
Figure 3A:
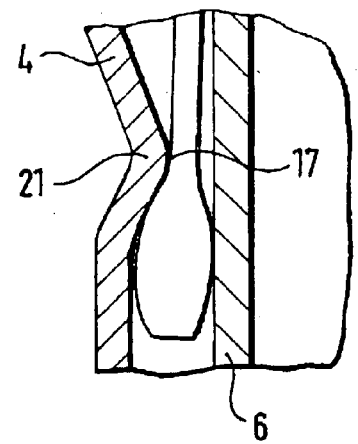

During the mounting of the compression stop cap 12, according to FIG. 3 the base 13 is placed on an end face 11 of the damping element 1, as a result of which the thickened ends 15 with convex contact profiles 16 bear on the container tube 6 of the damping element 1. The preferably three thickened ends 15 on the webs 14 of the compression stop cap 12, according to the enlargements in FIG. 2, have ribs 18 oriented radially outward and each having a contact profile 17, on which the rolling tube 4 is placed, according to the enlargement in FIG. 3. The rolling tube is formed with a circumferential shoulder 21 which engages the profiles 17. Cutouts 19, which ensure ventilation, can be arranged on the base 13.

The advantage of the use of the compression stop cap 12 resides in the cost-effective manufacture and fitting of the compression stop cap 12 and in its better possible configurations by means of the injection molding technique as compared with the prior art, where embossments 7 and a supporting ring 8, which was connected to the rolling tube 4, were required.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A shock absorber comprising:

a damping element having a container tube;

an air spring comprising a rolling tube and a concentrically arranged outer tube which is connected to said rolling tube by a spring bellows so that said rolling tube can move axially with respect to said outer tube, said spring bellows and said rolling tube bounding a gas chamber filled with a gas under pressure, said rolling tube being fixed on said container tube; and a compression stop cap which is received on said container tube between said container tube and said rolling tube, said stop cap having at least one axially extending web with a thickened end which supports said rolling tube concentrically with respect to said container tube, wherein said thickened end has a convex contact surface facing the container tube and a convex support surface facing the rolling tube.

2. A shock absorber as in claim 1 comprising three said axially extending webs equally spaced about the circumference of said cap.

3. A shock absorber as in claim 1 wherein each said thickened end extends at least partially around the circumference of the container tube.

4. A shock absorber as in claim 1 wherein said compression stop cap is made of injection molded plastic.

5. A shock absorber as in claim 1 wherein each said support surface comprises at least one rib.

6. A shock absorber as in claim 1 wherein said compression stop cap comprises a base which is received against an end of said container tube to dissipate axial force components acting on said stop cap.

7. A shock absorber as in claim 1 wherein said rolling tube has a contact diameter which is received against each said support surface.

* * * * *